United States Patent [19]

Hayamizu

[11] 4,223,989
[45] Sep. 23, 1980

[54] FOCUSING OPTICAL SYSTEM FOR SINGLE-LENS REFLEX CAMERAS

[75] Inventor: Yoshisada Hayamizu, Hachiouji, Japan

[73] Assignee: Olympus Optical Co., Ltd., Tokyo, Japan

[21] Appl. No.: 972,061

[22] Filed: Dec. 21, 1978

[30] Foreign Application Priority Data

Dec. 29, 1977 [JP] Japan .................................. 52-157919

[51] Int. Cl.³ ............................................. G03B 13/08
[52] U.S. Cl. ...................................... 354/59; 354/225
[58] Field of Search ................... 354/22, 23 R, 54–56, 354/59, 155, 219–225, 25, 201, 200, 199

[56] References Cited

U.S. PATENT DOCUMENTS

| 3,332,330 | 7/1967 | Broschke et al. | 354/55 |
| 3,529,528 | 9/1970 | Leitz | 354/25 |
| 4,063,261 | 12/1977 | Kuboshima | 354/225 |
| 4,104,651 | 8/1978 | Matsumoto et al. | 354/54 X |

FOREIGN PATENT DOCUMENTS

| 2659725 | 9/1977 | Fed. Rep. of Germany | 354/59 |
| 4879627 | 10/1973 | Japan . | |
| 5039128 | 4/1975 | Japan . | |
| 5081331 | 7/1975 | Japan . | |
| 50161230 | 12/1975 | Japan . | |
| 5233527 | 3/1977 | Japan . | |

Primary Examiner—L. T. Hix
Assistant Examiner—William B. Perkey
Attorney, Agent, or Firm—Cushman, Darby & Cushman

[57] ABSTRACT

A focusing optical system for single-lens reflex cameras comprising a semi-transparent mirror, lens and reflecting mirror, which are arranged near an exit surface of a penta-prism, and a detector arranged near an external surface of the penta-prism, the focusing optical system for single-lens reflex cameras being arranged to reflect a part of light from the penta-prism by the semi-transparent mirror, to further reflect that light by the reflecting mirror after it passes through the lens and to detect that light by the detector after it passes through the lens again.

1 Claim, 10 Drawing Figures

FOCUSING OPTICAL SYSTEM FOR SINGLE-LENS REFLEX CAMERAS

BACKGROUND OF THE INVENTION (a) Field of the Invention:

The present invention relates to a focusing optical system for single-lens reflex cameras and, more particularly, to a focusing optical system to be used for detecting that the lens system of camera is focused at the time of automatic focusing or photoelectric focusing of single-lens reflex cameras.

(b) Description of the Prior Art:

Known focusing optical system for single-lens reflex cameras are arranged, for example, as shown in FIG. 1. That is, the light passed through a photographing lens 1 is reflected by a mirror 2, passes through a focusing glass 3 and enters a penta-prism 4. Out of the light entered the penta-prism as above, a part of said light is taken out through a surface 4a of the penta-prism 4 and is imaged on a detector 6 by means of a lens 5 for the purpose of detecting that the photographing lens 1 is focused. FIG. 2 shows another example of known focusing optical system. This example is arranged that, out of the light passed through the focusing glass 3, a part of said light is branched by a semi-transparent mirror 7 before said light enters the penta-prism 4 and is led to the detector 6 for the purpose of detection. FIG. 3 shows still another example of known focusing optical system. In this example, a semi-transparent mirror 3a is formed in the focusing glass 3 and the light branched by the semi-transparent mirror 3a is detected in the same way as the example shown in FIG. 2. In the above-mentioned known examples, the lens for imaging on the detector is arranged outside the penta-prism of single-lens reflex camera and, therefore, these examples have the disadvantage that the upper portion of camera becomes large in size. Moreover, in these examples, a part of light is branched halfway in the optical path of finder. Especially in the examples in which the semi-transparent mirror is arranged in the optical path up to the penta-prism as shown in FIGS. 2 and 3, the field of the finder becomes partially dark and it is inconvenient for observation through the finder. Furthermore, in these examples, the distance from the image A on the focusing glass 3 to the detector 6 is short and, therefore, magnification by the lens 5 arranged in front of the detector 6 becomes necessarily small. Consequently, longitudinal magnification becomes very small and the detecting accuracy for focusing becomes low. There is still another example of known focusing optical system in which two detectors are used for the purpose of detection. In this example, however, it is necessary to arrange the detectors outside the penta-prism like the afore-mentioned examples and, moreover, the lenses for imaging on the detectors should be arranged in front of the detectors. Therefore, in the example in which two detectors are used, a still larger space is required for arranging those lenses and detectors and, consequently, the upper portion of the camera becomes very large.

SUMMARY OF THE INVENTION

It is, therefore, a primary object of the present invention to provide a focusing optical system for single-lens reflex cameras comprising a semi-transparent mirror arranged near the exit surface of a penta-prism, a reflecting mirror arranged to further reflect the light reflected by the semi-transparent mirror, a lens arranged near the reflecting mirror, and a detector arranged near an external surface of the penta-prism, the focusing optical system for single-lens reflex cameras being arranged so that a part of light coming from an object passing through a photographing lens and penta-prism is reflected by the semi-transparent mirror, further reflected by the reflecting mirror and then forms an image of the object on the detector by means of the lens, the focusing optical system for single-lens reflex cameras being small in size and having high detecting accuracy.

DETAILED DESCRIPTION OF THE PREFERRED EMBODIMENTS

Now, the detailed content of the focusing optical system for single-lens reflex cameras according to the present invention is described below based on the respective drawings.

Figure 1:
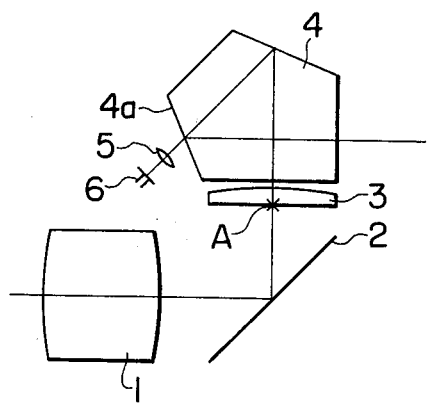
FIGS. 1 through 3 respectively show sectional views illustrating known focusing optical systems for single-lens reflex cameras.
Figure 2:
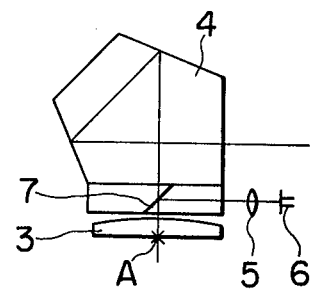
Figure 3:
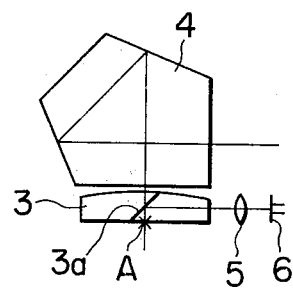
Figure 4:
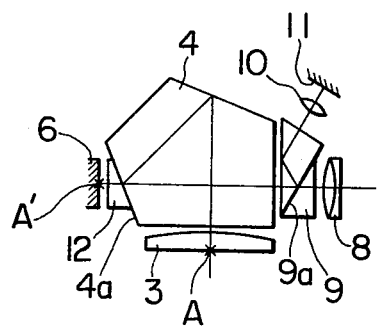
FIG. 4 shows a sectional view illustrating a first embodiment of the focusing optical system for single-lens reflex cameras according to the present invention.
Figure 5:
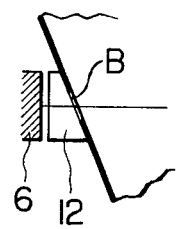
FIG. 5 shows an enlarged view illustrating the portion near the detector of the first embodiment of the present invention.

FIG. 4 shows the first embodiment of the present invention which is arranged as follows. That is, a transparent plate 9 with parallel plane surfaces is arranged between a penta-prism 4 and eyepiece 8, the transparent plate 9 having therein a semi-transparent mirror 9a arranged obliquely in respect to the optical axis. It is so arranged that the light, which is reflected by the semi-transparent mirror 9a, is reflected by a reflecting mirror 11 through a lens 10 and enters the penta-prism 4 again. At a part of mirror surface 4a of the penta-prism 4, a transparent or semi-transparent portion B is formed as shown in the enlarged state in FIG. 5. At that portion, a prism 12 is arranged and a detector 6 is arranged adjacent to the prism 12. Therefore, the above-mentioned light, which is reflected by the mirror 11 and entered the penta-prism 4 again, is directed to the detector 6 through the surface 4a. Thus, the image A of the object, which is formed by the photographing lens of the camera on focusing surface of the focusing glass 3, is formed again on the detector 6 as the image A' by means of the lens 10. In this embodiment, it is possible to observe the image of the object by means of the light which passed through the semi-transparent mirror 9a. At the same time, as the image A of the object is formed again on the detector 6 as the image A' by means of the light reflected by the semi-transparent mirror 9a, the fact that the photographing lens of the camera is focused is detected by detecting the image A' formed on the detector 6.

Figure 6:
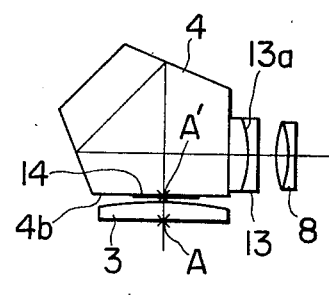
FIG. 6 shows a sectional view of a second embodiment of the present invention.

FIG. 6 shows the second embodiment of the present invention which employs a detector made of a transparent photo-conductive film or thin layer which is arranged to be transparent by making the film or layer of photo-conductive material thin. In this embodiment, a transparent plate 13 with parallel plane surfaces is arranged between the penta-prism 4 and eyepiece 8, the transparent plate 13 having therein a semi-transparent concave mirror 13a arranged concave toward the penta-prism 4. Besides, a transparent photo-conductive thin film or layer 14 is provided on the entrance surface 4b of the penta-prism 4. This embodiment is arranged so that the light, which is reflected by the semi-transparent concave mirror 13a, is directed to the transparent photo-conductive thin film or layer 14 by passing through the optical path inversely. Thus, the image A of the object formed on the focusing surface of the focusing glass 3 is formed again as the image A' on the transparent photo-conductive thin film or layer 14. By detecting the image A' by means of the transparent photo-conductive thin film or layer 14, it is detected that the photographing lens of the camera is focused. In this embodiment, it is also possible to use an intransparent photo-conductive film or layer instead of the transparent photo-conductive thin film or layer 14 as far as the intransparent photo-conductive film or layer is partially formed, on the entrance surface 4b of the penta-prism 4 or on some other surface, to the extent that the intransparent photo-conductive film or layer will not disturb the observation by the finder optical system.

Figure 7A:
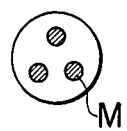
FIGS. 7A and 7B respectively show examples of reflecting mirrors to be used instead of the semi-transparent mirror in embodiments of the present invention.
Figure 7B:
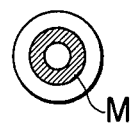
Figure 8A:
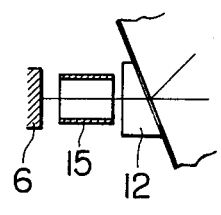
FIGS. 8A and 8B respectively show enlarged views illustrating other examples of arrangement of the portion near the detector.
Figure 8B:
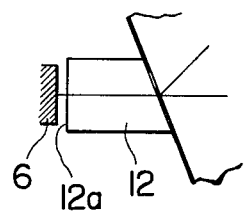

Instead of the flat or concave semi-transparent mirror in the transparent plate with parallel plane surfaces used in the above embodiments, it is also possible to used a partial mirror M which is formed on a flat or concave surface as shown in FIGS. 7A and 7B. Moreover, when a hood 15 is provided in front of the detector 6 as shown in FIG. 8A or when it is so arranged that the end face 12a of the prism 12 comes to a position close to the detector 6 as shown in FIG. 8B, it is possible to prevent the light other than the light required for detection from reaching the detector.

As explained in the above, when the focusing optical system for single-lens reflex cameras according to the present invention is used, the upper portion of the camera does not become so large because it is not necessary to arrange a lens in front of the detector and it is possible to arrange the detector at a position close to the penta-prism. Besides, as it is possible to arrange the lens 10 etc. at a position near the exit surface of the penta-prism, the distance between the conjugate points of the image on the focusing glass and detector can be made large and, therefore, it is possible to make the magnification of the image on the detector large. Consequently, it is possible to remarkably improve the detecting accuracy compared with known focusing optical systems. Moreover, due to the fact that the branching position of the optical path for detection from the finder optical system is arranged at a position of large distance from the position of the image on the focusing glass, the field of the finder does not become partially dark and it is convenient for observation through the finder.

I claim:

1. A focusing optical system for single-lens reflex cameras comprising a finder optical system arranged to observe a light from a photographing lens by means of an eyepiece after letting the light pass through a penta-prism, a semi-transparent mirror arranged between said penta-prism and said eyepiece in said finder optical system, a reflecting mirror arranged to further reflect the light reflected by said semi-transparent mirror and to return said light in inverse direction, a detector arranged at a position near an external surface of said penta-prism, and a lens arranged between said semi-transparent mirror and said reflecting mirror for the purpose of forming an image of said light reflected by said reflecting mirror onto said detector.

* * * * *